United States Patent [19]

Cussler et al.

[11] Patent Number: 4,966,707
[45] Date of Patent: Oct. 30, 1990

[54] LIQUID/LIQUID EXTRACTIONS WITH MICROPOROUS MEMBRANES

[75] Inventors: Edward L. Cussler, Edina, Minn.; Robert W. Callahan; Paul R. Alexander, Jr., both of Charlotte, N.C.

[73] Assignee: Celanese Corporation, New York, N.Y.

[21] Appl. No.: 862,807

[22] Filed: May 13, 1986

[51] Int. Cl.$^5$ ............................................. B01D 61/28
[52] U.S. Cl. .................................. 210/632; 210/638; 210/640; 210/321.75
[58] Field of Search ............... 210/638, 632, 634, 640, 210/321.75

[56] References Cited

U.S. PATENT DOCUMENTS

| | | | |
|---|---|---|---|
| 2,023,109 | 12/1935 | Van Dijck | 196/13 |
| 2,408,625 | 10/1946 | Graham et al. | 210/8.5 |
| 2,571,210 | 10/1951 | Craver | 260/637 |
| 3,244,763 | 4/1966 | Cahn | 260/677 |
| 3,956,112 | 5/1976 | Lee et al. | 210/644 |
| 4,051,230 | 9/1977 | Miyauchi | 210/648 X |
| 4,060,566 | 11/1977 | Yahnke | 260/677 |
| 4,113,886 | 9/1978 | Katz | 426/422 |
| 4,268,279 | 5/1981 | Shindo et al. | 55/16 |
| 4,437,994 | 3/1984 | Baker | 210/638 |
| 4,443,414 | 4/1984 | Kim | 423/54 |
| 4,789,468 | 12/1988 | Sirkar | 210/137 |

FOREIGN PATENT DOCUMENTS

| | | |
|---|---|---|
| 3138107 | 4/1983 | Fed. Rep. of Germany . |
| 2212163 | 7/1974 | France . |
| 2546408 | 11/1984 | France . |
| 1566253 | 4/1980 | United Kingdom . |

OTHER PUBLICATIONS

A. Kiani, R. Bhave, and K. Sirkar, *Journal of Membrane Science*, vol. 20, (1984) pp. 125-145.
N. D'Elia, L. Dahuron, and E. Cussler, "Liquid-Liquid Extractions With Microporous Hollow Fibers," Chem. Eng. and Mat. Sci., U. of Minn.
B. M. Kim, *Journal of Membrane Science*, vol. 21 (1984) pp. 5-19.
Kiani et al., Solvent Extraction with Immobilized Interfaces in a Microporous Hydrophobic Membrane, J. Mem. Sci., 20;125-145 (1984).
Perry et al., Chemical Engineer' Handbook, 5th edition, 17-34 through 17-43, (1973).
McCabe et al., Unit Operations of Chemical Engineering, pp. 619-626 (1976).
"Membrane-Based Solvent Extraction Process Shows Promise For Heavy Metal Recovery," The Hazardous Waste Consultant, Jan./Feb. 1984, pp. 1-14-1-17.
E. L. Cussler, "The Best Design For Hollow Fiber Membrane Modules," Proposal to Celanese Separations Products, Celanese Corp., Charlotte, N.C.
R. Prasad, A. Kiani, R. R. Bhave, and K. K. Sirkar, *Journal of Membrane Science* vol. 26 (1986) pp. 79-97.

*Primary Examiner*—Frank Spear
*Attorney, Agent, or Firm*—K. A. Genoni; J. M. Brown; F. D. Stine

[57] ABSTRACT

The rate of mass transfer in liquid/liquid extractions can be increased by the appropriate selection of a solubilizing liquid to wet a microporous membrane. A solute is transferred between immiscible liquids across the membrane where and interface between the liquids is immobilized at a surface of the membrane.

13 Claims, 3 Drawing Sheets

LIQUID/LIQUID EXTRACTIONS WITH MICROPOROUS MEMBRANES

BACKGROUND OF THE INVENTION

The present invention provides a process and apparatus for liquid/liquid extractions by means of microporous membranes. It has been found that the rate of mass transfer in such liquid/liquid extractions is increased by the process and apparatus of the present invention.

In general, a mass transfer process can be expressed as $$N = K(C_i - C_o)$$

where N is the flux of a species, i.e., the rate of mass transfer, $C_i$ and $C_o$ represent the concentration of the species at different times, i.e., the driving force, and K represents a resistance to the mass transfer, more often termed the overall mass transfer coefficient.

Liquid/liquid extraction is a unit operation separation process which exploits chemical differences between two liquids to affect a mass transfer of a species from one liquid to another. Equipment typically employed in liquid/liquid extraction comprises mixer-settlers, spray and packed extraction towers, and centrifugal extractors. See generally McCabe, W.L. and J C. Smith, *Unit Operations of Chemical Engineering*, 3rd Ed. (McGraw-Hill, N.Y. 1976) pp. 465-800. These methods employ intimate liquid/liquid contact. Accordingly, these are problems with emulsion formation as well as the contamination of one liquid with the other, such as by back mixing or flooding. Ibid. at 622-623.

To obviate problems inherent in extraction processes involving intimate liquid mixing, the art has used various membranes which function both to prevent the dispersion of one liquid into the other and to serve as the medium across which the extracted species is transferred from one liquid to the other. See Perry, R.H. and C.H. Chilton, *Chemical Enqineers' Handbook*, 5th Ed. (McGraw-Hill, N.Y., 1969), pp. 17-34 to 17-43.

More recently, selectively permeable membranes have been used in extraction processes. U.S. Pat. No. 4,268,279 discloses a gas transfer process which utilizes a microporous hollow fiber membrane. The patent is directed to the transfer of a solute in the gaseous phase between a first liquid fluid and a second gaseous or liquid fluid. Accordingly, the membrane employed therein is permeable to gaseous components but impermeable to liquids under operative conditions.

U.S. Pat. No. 4,443,413 discloses a process for separating molybdenum mineral values from tungsten values wherein the molybdenum values are transferred from one liquid solution to another liquid solution across a membrane. The patent employs indirect contact of an organic extractant solution and an aqueous leachate solution across a membrane such that the extractant material is not in direct contact with the aqueous feed.

Kiani, A. et al, *Journal of Membrane Science*, vol. 20, pp. 125-145 (1984), discloses an extraction process employing a microporous hydrophobic membrane having an immobilized liquid/liquid interface. However, Kiani et al discuss only planar hydrophobic membranes for extracting acetic acid and, moreover, do not discuss the criteria by which a liquid/liquid and membrane system is chosen for an extraction process. The present invention is particularly directed to selecting an appropriate liquid to wet the membrane and thereby increase the mass transfer rate in liquid/liquid extractions, a problem which is not addressed by Kiani et al.

By the present invention, the rate of mass transfer in liquid/liquid extraction processes can unexpectedly be increased by orders of magnitude over the mass transfer rates of prior art extraction processes by the proper selection of the appropriate liquid to wet the microporous membrane. The art has heretofore not recognized how to effectively increase mass transfer rates in liquid/liquid extraction processes by the appropriate selection of the liquid/liquid and membrane system across which a solute species is transported Accordingly, an object of the present invention is to provide a process for increasing the mass transfer rate in liquid/liquid extractions employing microporous membranes.

Another object of the present invention is to provide a process for selecting a liquid to wet a microporous membrane used in such extraction processes to effectively increase the mass transfer rate thereof.

Yet another object of the present invention is to provide a process and apparatus for extractions having a liquid/liquid interface immobilized at a surface of a wetted microporous membrane Yet further objects will become apparent to the skilled artisan upon examination of the detailed description of the invention.

SUMMARY OF THE INVENTION

The present invention provides a process for extracting a solute between immiscible liquids across a microporous membrane comprising wetting the microporous membrane with the liquid in which the solute is more soluble, immobilizing an interface between the liquids at a surface of the wetted microporous membrane, and extracting said solute. Preferably a multiplicity of hollow fibers are utilized as the microporous membrane.

The present invention also provides a process for extracting a solute from a feed liquid into an extractant liquid wherein the liquids are immiscible, comprising: determining the solubilizing liquid; selecting a microporous membrane having a membrane surface; wetting the microporous membrane with the solubilizing liquid to produce a wetted microporous membrane; immobilizing the solubilizing liquid at the membrane surface; and extracting the solute between the liquids and across the wetted microporous membrane. Preferably, a multiplicity of hollow fibers are utilized as the microporous membrane.

Further, the present invention provides an apparatus for extracting a solute from a feed liquid stream into an extractant liquid stream, the liquids being immiscible and one of the liquids being a solubilizing liquid, across a microporous membrane, comprising: means for providing the feed liquid stream; means for providing the extractant liquid stream; a microporous membrane wet by the solubilizing liquid and having a membrane surface; and means for immobilizing the solubilizing liquid at the membrane surface. Preferably, a multiplicity of hollow fibers are utilized as the microporous membrane.

DETAILED DESCRIPTION OF THE INVENTION

Figure 1:
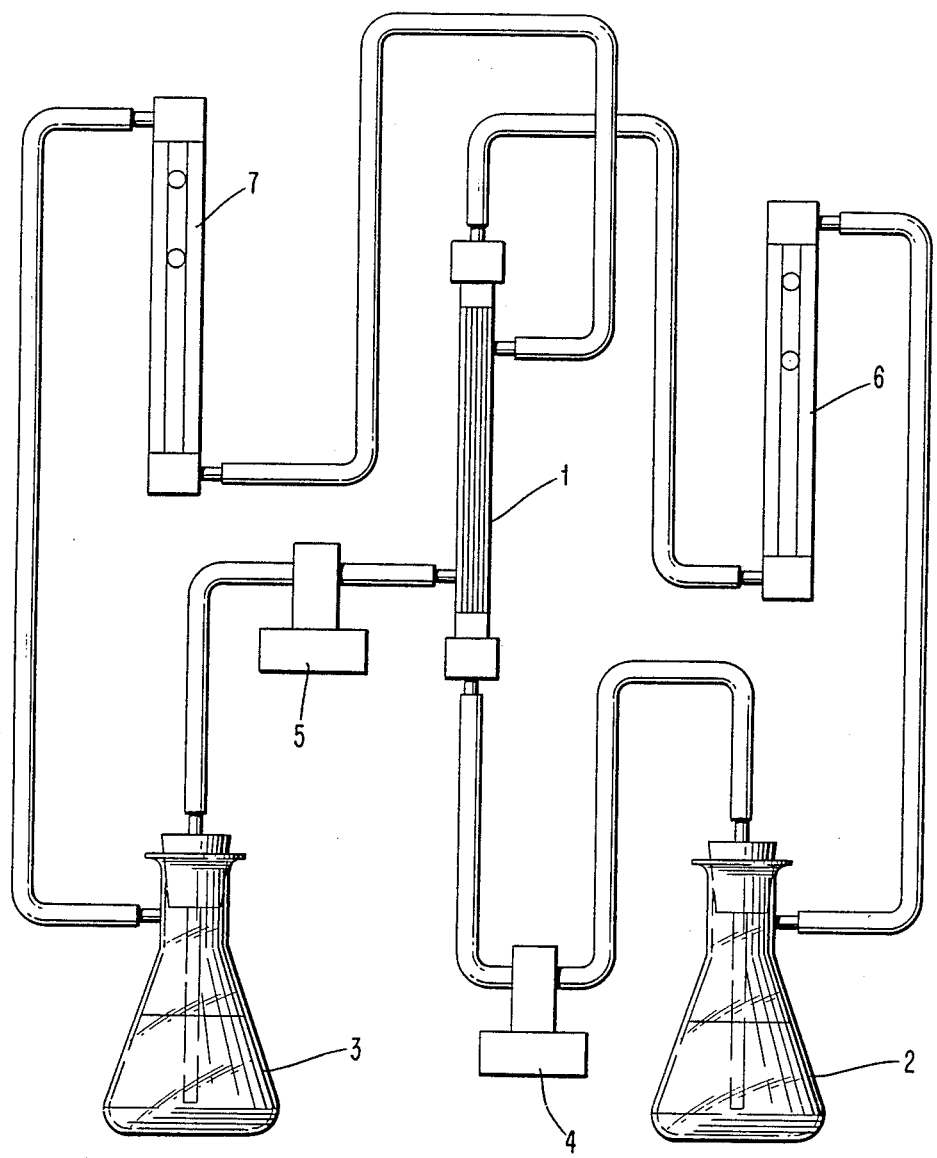
FIG. 1 depicts an apparatus of the present invention.

The present invention provides a process and apparatus for liquid/liquid extractions utilizing microporous membranes wherein the rate of mass transfer is greatly improved over prior art liquid/liquid extraction techniques.

Liquid/liquid extraction processes typically involve a liquid feed stream comprising a solute and an immiscible liquid extractant stream. Mass transfer of the solute can occur at an interface between the two immiscible phases. It is typical in these processes to attempt to increase their efficiency for mass transfer by maximizing the interfacial surface area between the two phases. Traditionally, liquid/liquid extraction processes have been carried out in devices such as packed towers, mixersettlers, etc., which seek to optimize this interfacial surface area. The intimate mixing that often occurs in these devices often, however, leads to the formation of stable emulsions of the two phases, thereby inhibiting phase separation and product recovery. Traditional liquid/liquid extraction systems have avoided using liquids having similar densities, a situation which appears to promote this problem of emulsion formation. Additional limitations present in packed tower systems include tower loading requirements and flooding restrictions.

The process of the present invention uses a microporous membrane to establish a support for interfacial contact between the two immiscible liquids. When such a microporous membrane is wet with a liquid fluid, the fluid fills the pores of the membrane. If a second immiscible liquid is then allowed to contact the membrane on one side of the membrane, an interfacial contact area is established on that side of the membrane at its surface. This interface is stabilized at the membrane surface b maintaining a higher pressure on the non-wetting liquid than on the wetting liquid, but a pressure lower than that necessary for the non-wetting liquid to displace the wetting liquid from the pores of the membrane. (This stabilization requirement has been discussed by Kiani, et al.) When the liquid/liquid extraction interface is established at the surface of the microporous membrane in the process described above, the problems discussed above for traditional liquid/liquid extraction systems can be avoided.

The present invention is especially directed to the extraction of a solute between immiscible liquid streams by means of a microporous membrane material. It has unexpectedly been found that the rate of mass transfer can be greatly increased by selecting as the liquid to wet the microporous membrane the liquid in which the solute is more soluble. Hence, there will be cases in which the feed liquid can wet the membrane and other cases in which the extractant liquid can wet the membrane.

The present invention achieves significantly increased mass transfer rates by the use of microporous membranes, preferably in the configuration of hollow fibers, in combination with the proper selection of the liquid which wets the membrane. It is well known in the art that an increase in the rate of mass transfer in an extraction process can be achieved by an increase in the surface area for fluid contact. The art has thus recognized the advantages of using membranes in the shape of hollow fibers as opposed to a planar configuration due to the increase in surface area for mass transfer. However, the art heretofore has not recognized how the appropriate selection of the liquid wetting the microporous membrane can also increase the mass transfer rate. The use of hollow fibers a opposed to planar membranes in a given process achieves an arithmetic increase in the mass transfer rate. It has unexpectedly been found that the selection of an appropriate membrane geometry, e.g., hollow fibers, combined with the selection of an appropriate liquid to wet the microporous membrane achieves a multiplicative increase in the mass transfer rate that far exceeds an expected additive increase.

The solute extracted by means of the present invention can comprise virtually any species which is soluble in both the feed and the extractant. Both organic and inorganic species can be separated by means of the present invention. Further, polymeric species, especially proteins, having a diameter of less than about the membrane pore size, can be separated by the present process. Still further, multiple solute species can be separated by the present invention. In preferred embodiments the solute species is organic. Most preferred are solutes comprising biological compounds, such as, but not limited to, polypeptides and proteins, and bioaffecting compounds, such as, but not limited to, pharmaceuticals, enzymes, vitamins, and hormones. Still further, the present invention can be used to extract inorganic species, of which metal ions and metal complexes and mixtures thereof are preferred, and of which $Au^{3+}$ is especially preferred.

To practice the present invention, the solubilizing liquid must be determined, that is, it is necessary to know in which of the liquids, the feed or the extractant, the solute which is to be extracted is more soluble. This determination can be done by methods well known in the art. These include, for example, the use of solubility data, effectiveness, or partition coefficients for liquid/liquid extractions systems which do not use membranes and which are well known in the art, or from manufacturers' data for commercially available extractants for removing specific solutes. If only a feed liquid comprising a solute is known, then an extractant liquid can be chosen such that it is immiscible with the feed liquid and the relative solubility of the solute can be determined by partition coefficient experiments well known to those skilled in the art. In other words, one of the immiscible liquids, the feed or the extractant, must necessarily be the solubilizing liquid; that is, one must be the liquid in which the solute is more soluble than in the other. It is within the exercise of ordinary skill in the art to conventionally determine in which of the immiscible liquids the solute is more soluble. The liquid in which the solute is more soluble will be termed hereinafter the solubilizing liquid.

Once the solubilizing liquid is determined, a microporous membrane is selected which will be wet by the solubilizing liquid. One method for determining if a membrane is wet by a liquid is by changes in the light transmittance of the membrane. A microporous membrane is usually translucent but not transparent. When such a membrane is immersed in a liquid and then removed, the membrane will appear transparent if the solution wets the membrane; otherwise the membrane will remain translucent. In this instance the liquid is said to spontaneously wet the microporous membrane. This phenomenon of spontaneous wetting occurs when the surface tension of the liquid is less than the critical surface tension of the membrane, which parameters are readily known or conventionally ascertainable by those of ordinary skill in the art.

Preferred microporous membrane compositions include polyolefins, cellulose esters polymers, polyamides, polyacrylamides, poly(sulfonated styrene), polysulfones, and polyacrylics. Most preferred are cellulose acetate polymers, polyethylene, polypropylene, polymethylpentene, and polytetrafluoroethylene.

Preferred microporous membrane structures include a microporous membrane having a thickness of 1–75 microns, an average pore size of 50–2000 angstroms, and a porosity of from less than 1% up to about 99%. In the case of microporous hollow fiber membranes, it is preferred that such membranes have a wall thickness of 1–75 microns, an inner diameter of 5–1500 microns, an average pore size of 50–2000 angstroms, and a porosity of from less than 1% up to about 99%. Especially preferred are Celgard TM microporous membranes, and most especially Celgard microporous hollow fibers (which are commercially available from Celanese Separations Products, Charlotte, N.C.).

Figure 5:
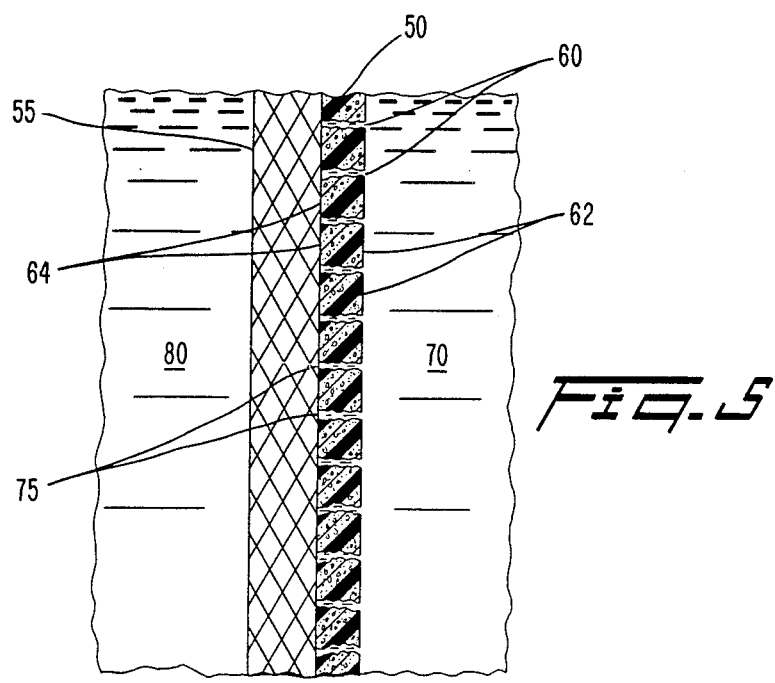
FIG. 5 is a graphic depiction on a microscopic scale of the microporous membrane and the liquid/liquid system of the present invention.

FIG. 5 shows, on a microscopic scale, the liquid/liquid and membrane system of the present invention. The microporous membrane 50 can be of planar geometry and supported by a rigid backing, such as the support screen 55. The solubilizing liquid 70 contacts a surface 62 of the membrane and wets the membrane, thereby being present in the pores 60 of the membrane. The other liquid 80 contacts an other surface 64 of the membrane. An interface 75 between the two liquids is immobilized at a surface of the membrane, specifically, the surface of the membrane in contact with the non-solubilizing liquid.

Once it is determined which one of the liquids is the solubilizing liquid and therefore is to wet the microporous membrane, it is irrelevant whether the solubilizing liquid is the feed or the extractant. To practice the present invention, it is sufficient that the liquid which wets the membrane is the one in which the solute to be extracted is more soluble. It is preferred that the extractant liquid be the solubilizing liquid.

For example, suppose one desires to extract penicillin from an aqueous solution into an organic acetate which is water immiscible. If the aqueous solution is basic, i.e., pH greater than 7, then the penicillin is ionized and more soluble in the aqueous phase than in the organic phase. Therefore, a micro porous membrane which is spontaneously wet by water can be chosen for the extraction process. A suitable microporous membrane material can include, for example, cellulose acetate or sulfonated polystyrene. On the other hand, if the aqueous solution is acidic, then the penicillin is non-ionic and more soluble in the organic phase. In this case, a microporous membrane material which is spontaneously wet by the organic acetate can be chosen for the extraction, for example, microporous polypropylene, polymethylpentene, or polysulfone.

The following examples will further elucidate various embodiments, objects, and advantages of the present invention, the same intending to be illustrative and in no manner limitative.

EXAMPLE I

This example involves the extraction of a p-nitrophenol solute from a water feed liquid into an amyl acetate extractant liquid. This system is often used to model antibiotic extractions. The apparatus used is shown in FIG. 1. Hollow fiber module 1, analogous to a shell and tube heat exchanger, comprises 120 microporous polypropylene hollow fibers commercially available under the tradename Celgard X20 (characterized as having an internal diameter of 413 microns, a wall thickness of 26.5 microns, a void fraction of 40%, and a pore size ranging from about 0.03 to about 0.05 microns). The aqueous feed reservoir 2 contains the p-nitrophenol solute in the water feed liquid and is connected to the tube side of the module 1 via flow meter 6. The organic extractant reservoir 3 contains the amyl acetate extractant liquid and is connected to the shell side of the module 1 via flowmeter 7. The recirculating fluid is returned to the respective reservoirs via pumps 4 and 5. The reservoir concentrations were measured spectrophotometrically. It was determined that the solute is seventy times more soluble in the extractant liquid than in the feed liquid, thus the extractant liquid is the solubilizing liquid. The microporous polypropylene membrane was chosen because it is extremely hydrophobic and, hence, it is spontaneously wet by the extractant/solubilizing liquid.

Figure 2:
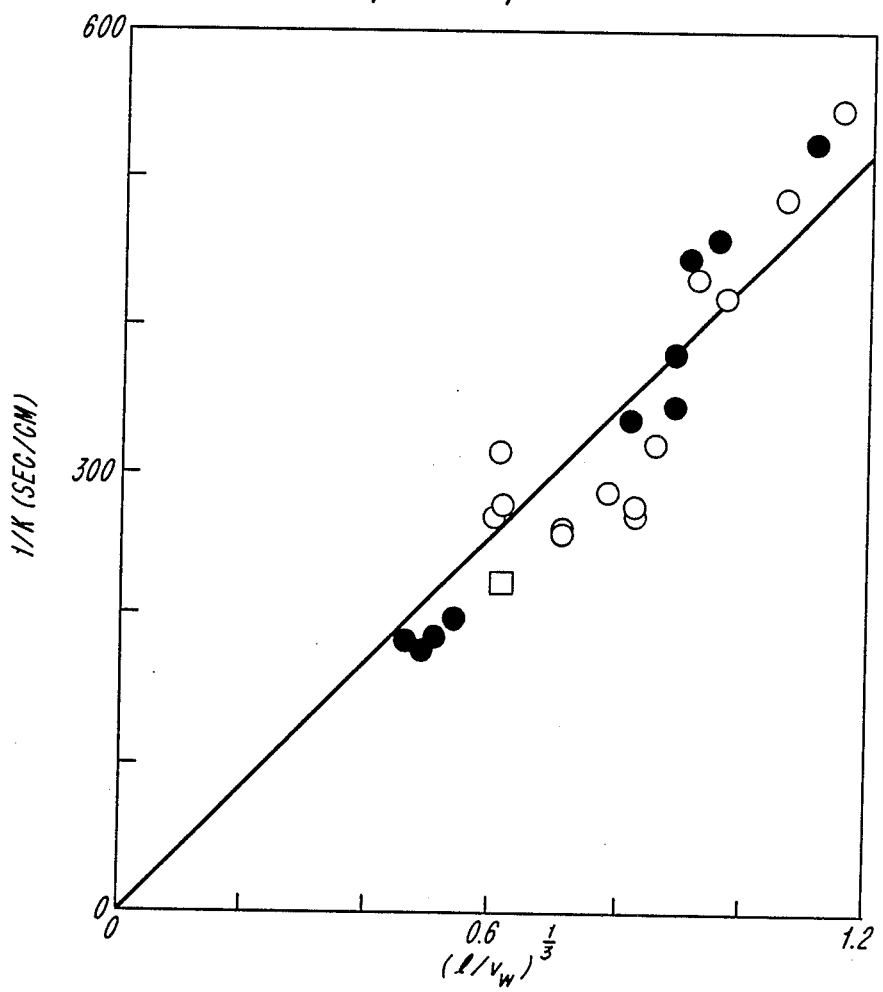
FIG. 2 is a graphic depiction of the overall mass transfer coefficient (K) as a function of water flow ($v_w$) (corrected for the fiber length (l)) for a series of extractions.

The overall mass transfer coefficient can be obtained by methods well known to those skilled in the art, and after a series of experiments, the relationship of the overall mass transfer coefficient to the flow of the non-solubilizing liquid, the feed liquid in this case, can be determined. These results are shown in FIG. 2. The open and closed circles in FIG. 2 represent fiber modules of different lengths used in co-current extraction; the square represents a counter-current extraction. It can be seen from this figures that as the non-wetting feed liquid flow rate ($1/v_w$) is increased, the overall mass transfer coefficient also increases.

Figure 3:
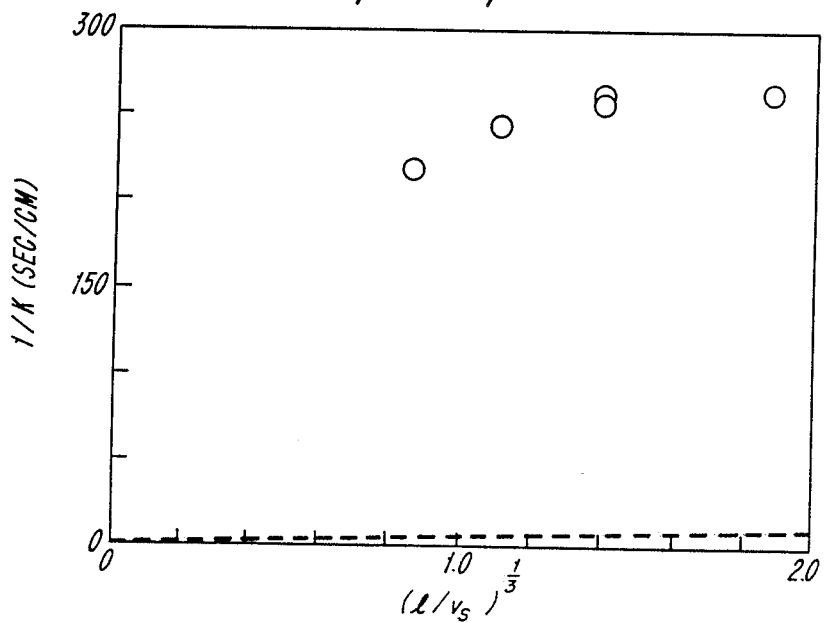
FIG. 3 is a graph of the overall mass transfer coefficient (K) as a function of amyl acetate flow ($v_s$) (corrected for the fiber length (l)) for the same series of extractions as in FIG. 2.

While the increase in mass transfer coefficient with the increasing flow of the non-wetting liquid may not seem unexpected at first glance, it is actually surprisingly unexpected in view of the results shown in FIG. 3. The circular data points in FIG. 3 represent the mass transfer coefficient (K) at various organic extractant liquid flow rates ($1/v_s$). The dotted line represents the expected results assuming there is no resistance offered by the aqueous feed liquid to the mass transfer. It can be seen in FIG. 3 that the overall mass transfer coefficient is virtually unaffected by changes in the flow rate of the wetting liquid. In other words, the mass transfer coefficient is virtually independent of the flow rate of the wetting liquid when the wetting liquid is also the solubilizing liquid.

COMPARATIVE EXAMPLE I

Figure 4:
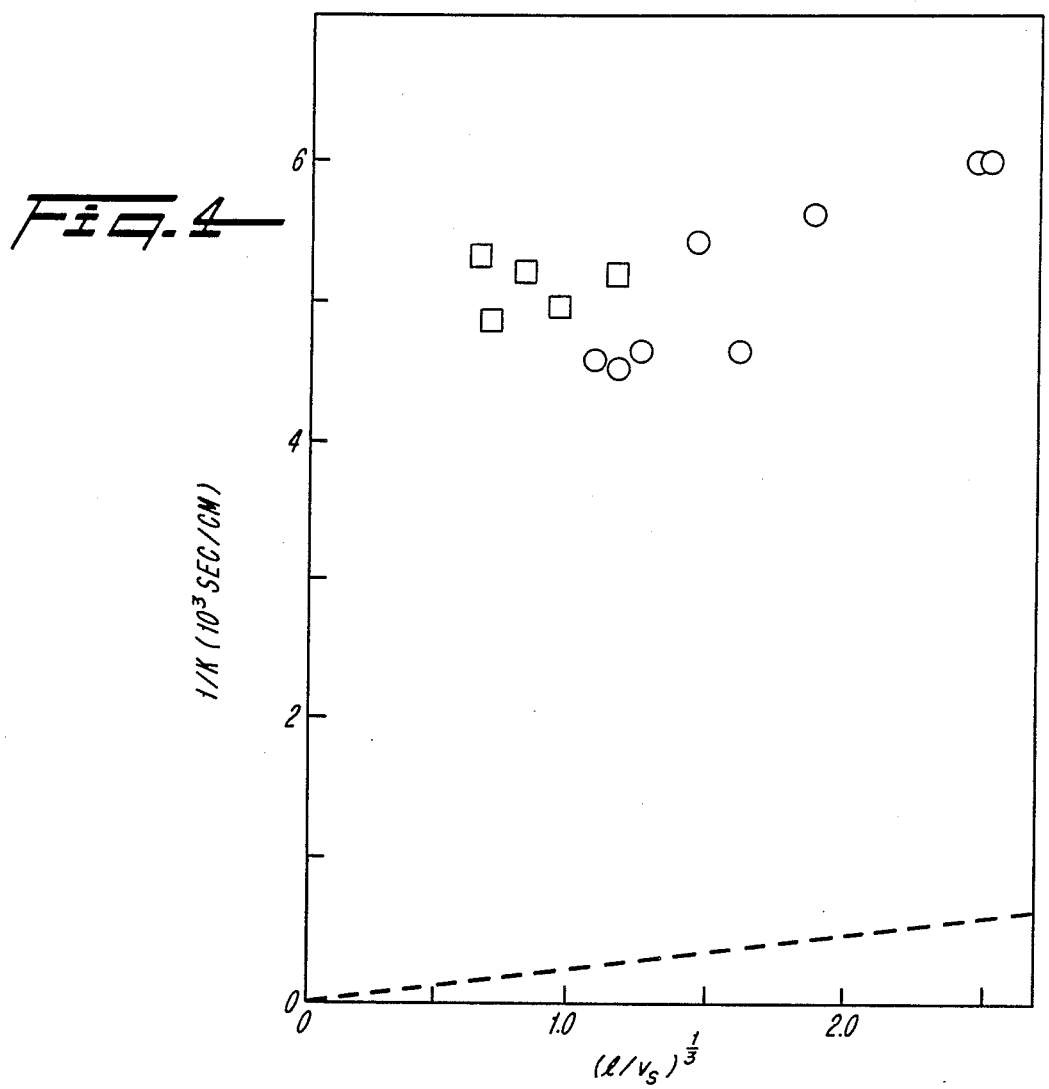
FIG. 4 is a graph of the overall mass transfer coefficient (K) as a function of the organic liquid flow rate ($v_s$) for a comparative extraction.

The apparatus of the above example was used to extract an acetic acid solute from a water feed liquid into a methyl amyl ketone extractant liquid. Although acetic acid is more soluble in water than in the ketone, i.e., an aqueous solubilizing liquid, the same polypropylene microporous hollow fiber membrane was used, i.e., the microporous membrane is wet by the liquid which is not the solubilizing liquid. The results of this extraction are depicted in FIG. 4. The circles represent a fixed aqueous feed liquid velocity and the squares represent a fixed ketone extractant liquid velocity. The dotted line represents a conventional calculation of the mas transfer coefficient assuming there is no resistance due to the membrane. It can be seen from this figure that the mass transfer coefficient is unaffected by changes in either the aqueous feed liquid flow rate or the ketone extractant liquid flow rate.

The difference between the actual data points and the expected results (as shown by the dotted line in FIG. 4) for the acetic acid extraction is consistent with the process of the present invention. Because the microporous polypropylene membrane is wet by the ketone and thus the membrane is not wet by the liquid in which the solute is more soluble, the extraction rates are much lower than could be achieved by the appropriate selection of the wetting liquid. The diffusion coefficients for p-nitrophenol and acetic acid are both about $10^{-5}$ cm.$^2$/s. in water and would not be expected to differ much in amyl acetate or methyl amyl ketone. However, the mass transfer coefficient for the acetic acid is about $0.2 \times 10^{-3}$ cm./s., as opposed to about $3.0 \times 10^{-3}$ cm./s. for the p-nitrophenol extraction. Thus, the mass transfer coefficient for the p-nitrophenol extraction is fifteen times greater than that for the acetic acid extraction. This comparative example is essentially the same as the extraction performed by Kiani et al, mentioned above, except that Kiani et al do not disclose examples utilizing hollow fibers. The actual mass transfer rate is the product of the total surface area for mass transfer, the change in concentration over time, and the overall mass transfer coefficient.

EXAMPLE II

An apparatus similar to that used in the above examples was utilized, and especially, microporous polypropylene hollow fibers, available under the tradename Celgard X20, were utilized. In this example, a solute comprising $Au^{3+}$ was extracted from a hydrochloric acid feed liquid into a diethylene glycol dibutyl ether (DGDE) extractant liquid. The microporous hollow fiber membranes were wet out by the DGDE, and it was determined that the solute, $Au^{3+}$, was approximately fifty times more soluble in DGDE than in hydrochloric acid (i.e., the partition coefficient, H, is 50); thus the solubilizing liquid wets the microporous membrane.

Mass transfer coefficients were calculated as in the above-described extractions and were found to be dependent upon the velocity of the non-solubilizing liquid (the hydrochloric acid) and independent of the velocity of the solubilizing liquid (the DGDE). The mass transfer coefficient was found to be about $1 \times 10^{-3}$ cm./s. for this extraction.

COMPARATIVE EXAMPLE II

The apparatus identical to that of Example II was used to extract $Au^{3+}$ as a solute from DGDE as a feed liquid into a 2% KCN solution buffered at pH9 as an extractant solution. Again, the microporous hollow fiber membranes were wet out by the DGDE. In this instance, however, H=0.027; that is, $Au^{3+}$ is about 37 times more soluble in the KCN solution (the inverse of 37 is 0.027) than in the DGDE. Thus, the solubilizing liquid, the KCN, does not wet the membrane.

The mass transfer coefficients were calculated as above and were found to be essentially independent of the nonwetting/solubilizing liquid velocity (i.e., the aqueous KCN) and to be only slightly dependent upon the velocity of the wetting liquid (i.e., the DGDE). The mass transfer coefficients were found to be about $8 \times 10^{-6}$ cm./s., about 100 times lower than that estimated assuming no membrane resistance.

It can be seen from Example II and Comparative Example II that the mass transfer coefficient for $Au^{3+}$ extraction is 13 times larger when the preferred liquid, that is, the solubilizing liquid, wets the membrane than when the other, non-solubilizing liquid wets the membrane.

While not desirous of being constrained to a particular theory, it is believed that these experiments show that the mass transfer is occurring through the pores of the membrane and that the only significant resistance to mass transfer, in the process of the present invention, is the boundary layer between the nonwetting liquid and the membrane. It is further believed that the wetting of the membrane by the liquid in which the solute is more soluble virtually negates resistances to mass transfer caused by the membrane and the solubilizing/wetting liquid. Thus, the combination of an advantageous membrane geometry with the appropriate selection of the liquid to wet the microporous membrane achieves mass transfer rates which are unexpectedly greater than those achieved with hollow fiber membranes alone and unexpectedly and substantially greater than conventional extraction processes.

While the present invention has been described in terms of preferred embodiments, it is to be understood that variations and modifications can be made by those of ordinary skill in the art without departing from the spirit of the invention. Such variations and modifications are intended to be within the scope of the present invention as defined by the claims herein.

What is claimed is:

1. A process for extracting a solute from a feed liquid into an extractant liquid wherein said liquids are immiscible, comprising the steps of:
   (a) determining in which one of said feed and extractant liquid the solute is more soluble;
   (b) selecting a microporous membrane having opposing membrane surfaces;
   (c) wetting said microporous membrane by allowing said feed liquid or said extract liquid determined in step (a) as the one liquid in which said solute is more soluble to be brought into contact with one of said membrane surfaces so as to fill completely the pores of said membrane and to thereby produce a wetted microporous membrane whose filled pores consist solely of said one liquid;
   (d) immobilizing said one liquid at the other said membrane surface;
   (e) bringing the other of said feed and extractant liquids not filling the pores of the membrane and in which said solute is less soluble into contact with said one liquid at said other membrane surface to thereby establish an interfacial contact between said one and other liquids; and thereafter
   (f) extracting said solute between said one and other liquids at said established interface.

2. The process as defined in claim 1 wherein said microporous membrane comprises at least one hollowfiber.

3. The process as defined by claim 2 wherein said hollow fiber membrane comprises a microporous polyolefin membrane in the geometry of a hollow fiber having a wall thickness of 1–75 microns, an inner diameter of 5–1500 microns, an average pore size of 50–2000 angstroms, and a porosity of up to about 99%.

4. The process as defined by claim 1 wherein said microporous membrane comprises a microporous polyolefin membrane having a thickness of 1–75 microns, an average pore size of 50–2000 angstroms, and a porosity of up to about 99%.

5. The process as defined in claim 1 wherein said solute is a bioaffecting compound.

6. The process as defined in claim 1 wherein said solute is an organic compound selected for the group consisting of pharmaceuticals, enzymes, proteins, vitamines, and hormones.

7. The process as defined by claim 1 wherein said solute comprises an inorganic compound.

8. The process as defined by claim 1 wherein said solute comprises a compound selected from the group consisting of metal ions and metal complexes and mixtures thereof.

9. The process as defined by claim 8 wherein said solute comprises $Au^{3+}$.

10. An apparatus for extracting a solute from a feed liquid stream into an extractant liquid stream at an interface therebetween established at one surface of a microporous membrane, said liquids being immiscible and one of said liquids being a solubilizing liquid in which said solute is more soluble as compared to the other of said liquids, said apparatus comprising: a microporous membrane; means for providing said feed liquid stream to one side of said membrane; means for providing said extractant liquid stream to the other side of said membrane; said microporous membrane being wet solely by said solubilizing liquid thereby having filled pores consisting of said solubilizing liquid; and means for immobilizing said solubilizing liquid at a surface of said wetted membrane thereby for establishing an interfacial contact between said one liquid and the other of said feed and extractant liquid streams.

11. The apparatus as defined in claim 10 wherein said microporous membrane comprises at least one hollow fiber.

12. The apparatus as defined in claim 11 wherein said hollow fiber membrane comprises a microporous polyolefin membrane having a wall thickness of 1–75 microns, an inner diameter of 5–1500 microns, an average pore size of 50–2000 angstroms, and a porosity of up to about 99%.

13. The apparatus as defined in claim 10 wherein said membrane comprises a microporous polyolefin membrane having a thickness of 1–75 microns, an average pore size of 50–2000 angstroms, and a porosity of up to about 99%.

* * * * *